(12) United States Patent
Bendahan et al.

(10) Patent No.: US 10,386,504 B2
(45) Date of Patent: Aug. 20, 2019

(54) HIGH DYNAMIC RANGE RADIOGRAPHIC IMAGING SYSTEM

(71) Applicant: Rapiscan Systems, Inc., Torrance, CA (US)

(72) Inventors: Joseph Bendahan, San Jose, CA (US); Jayesh Ranchhodbhai Patel, Simi Valley, CA (US)

(73) Assignee: Rapiscan Systems, Inc., Torrance, CA (US)

(*) Notice: Subject to any disclaimer, the term of this patent is extended or adjusted under 35 U.S.C. 154(b) by 361 days.

(21) Appl. No.: 15/298,503

(22) Filed: Oct. 20, 2016

(65) Prior Publication Data

US 2017/0123077 A1 May 4, 2017

Related U.S. Application Data

(60) Provisional application No. 62/244,226, filed on Oct. 21, 2015.

(51) Int. Cl.
| | | |
|---|---|---|
| G01T 1/24 | (2006.01) | |
| G01T 1/202 | (2006.01) | |
| G01T 1/20 | (2006.01) | |
| G01V 5/00 | (2006.01) | |

(52) U.S. Cl.
CPC ............ *G01T 1/202* (2013.01); *G01T 1/2018* (2013.01); *G01T 1/248* (2013.01); *G01V 5/0016* (2013.01); *G01V 5/0041* (2013.01)

(58) Field of Classification Search
None
See application file for complete search history.

(56) References Cited

U.S. PATENT DOCUMENTS

| | | | |
|---|---|---|---|
| 5,463,224 A | 10/1995 | Burstein | |
| 2007/0147585 A1 | 6/2007 | Eilbert | |
| 2007/0206721 A1 | 9/2007 | Tkaczyk | |
| 2008/0047482 A1 | 2/2008 | Venkataramani | |
| 2010/0102242 A1 | 4/2010 | Burr | |
| 2011/0163236 A1 | 7/2011 | Arodzero | |
| 2012/0093289 A1* | 4/2012 | Arodzero | G01V 5/0041 378/57 |
| 2014/0050296 A1 | 2/2014 | Ying | |
| 2016/0095559 A1* | 4/2016 | Gagnon | A61B 6/4241 600/425 |

OTHER PUBLICATIONS

International Search Report for PCT/US2016/057833, dated Mar. 2, 2017.

* cited by examiner

*Primary Examiner* — Hoon K Song
(74) *Attorney, Agent, or Firm* — Novel IP

(57) ABSTRACT

The present specification provides an X-ray inspection system including an X-ray source and a corresponding detector for detecting transmitted X rays having a wide range of intensities. The detector includes at least one crystal for producing a light signal upon interaction with X-rays. Each crystal is connected to at least one photodiode and a photomultiplier. A processing unit connected with the crystal rejects all detected radiation having energies below a predefined threshold value.

19 Claims, 12 Drawing Sheets

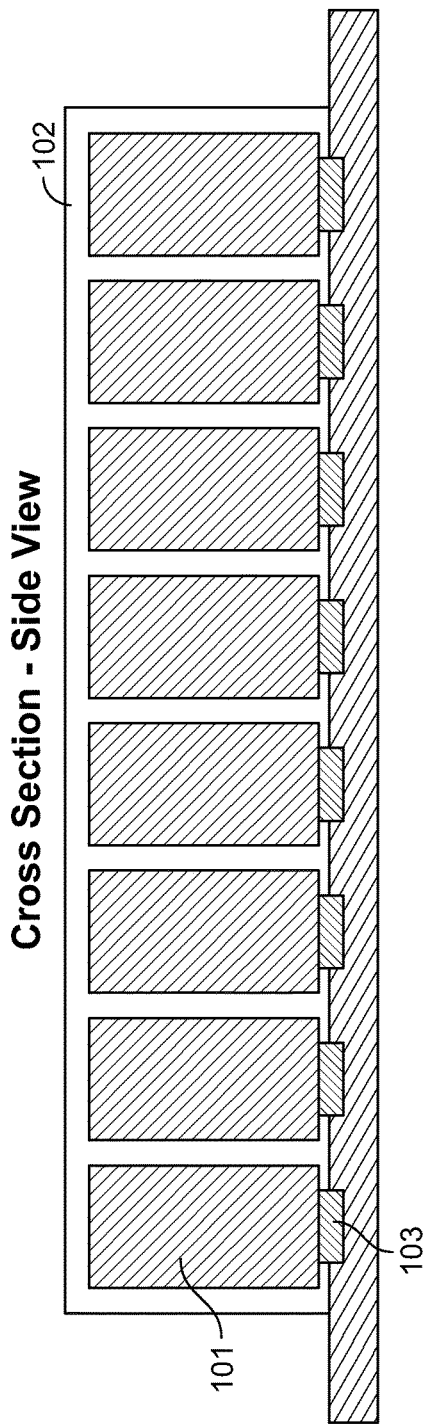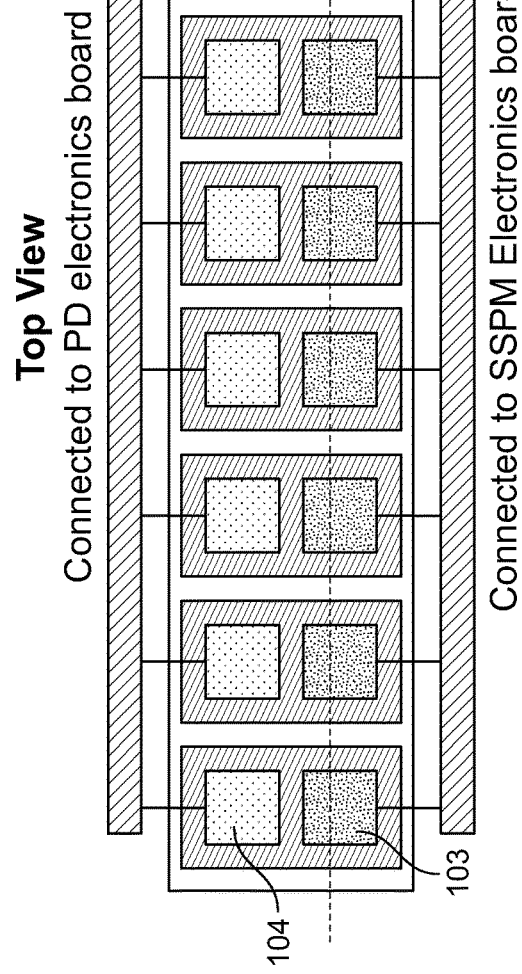
FIG. 1A
FIG. 1B

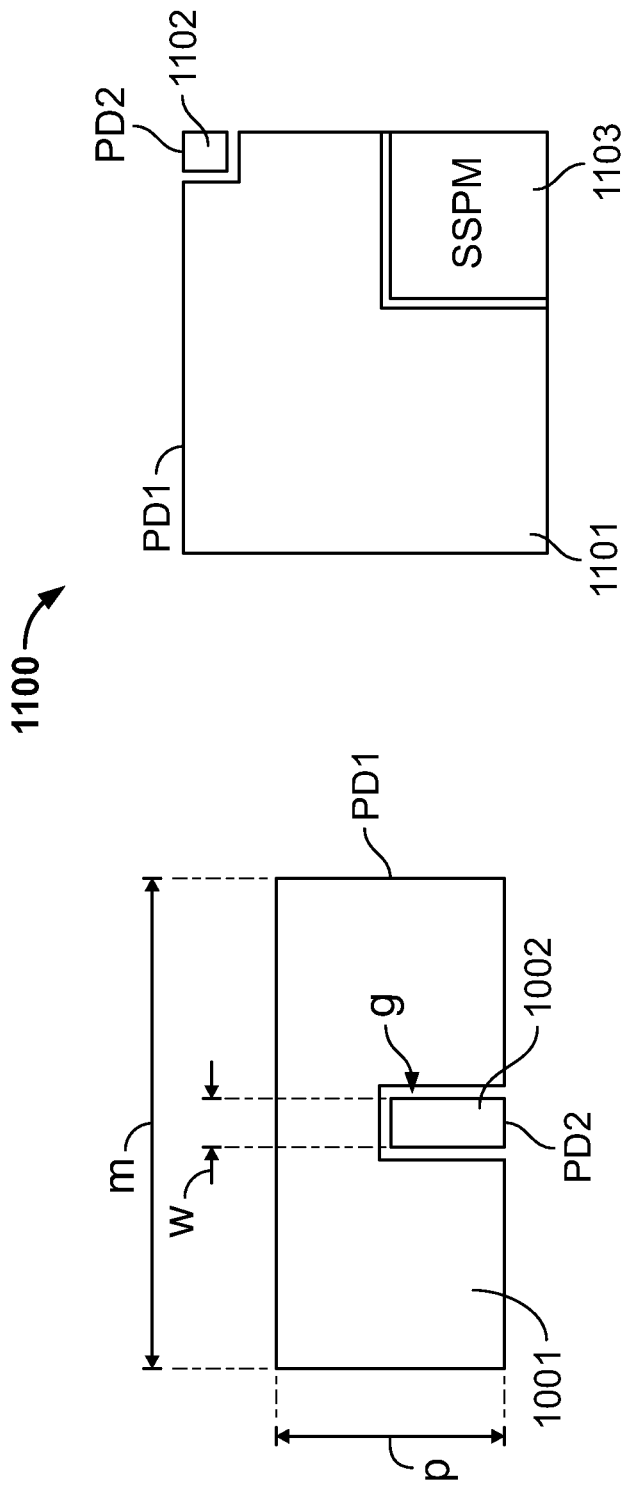

HIGH DYNAMIC RANGE RADIOGRAPHIC IMAGING SYSTEM

CROSS-REFERENCE

The present application relies on, for priority, U.S. Patent Provisional Application No. 62/244,226, entitled "High Dynamic Range Radiographic Imaging System", and filed on Oct. 21, 2015, which is herein incorporated by reference in its entirety.

FIELD

The present specification generally relates to imaging systems and in particular to an advanced radiographic imaging system having a high dynamic range of operation.

BACKGROUND

The physical shipment of materials, including the shipment of mail, merchandise, raw materials, and other goods, is an integral part of any economy. Typically, the materials are shipped in a type of shipping container or cargo box. Such containers or boxes include those used on semi-trailers, large trucks, and rail cars as well as inter-modal containers that can be carried on container ships or cargo planes. However, such shipping or cargo containers may be used for the illegal transportation of contraband such as nuclear and radioactive materials. The detection of such threats requires a rapid, safe and accurate inspection system for detecting the presence of hidden contraband materials.

X-ray imaging is one of the most common methods used for detecting contraband materials in cargo. However, during the inspection of large or fast moving containers, such as in a rail car, it is common for traditional X-ray systems to produce images with dark areas due to inadequate penetration by the radiation. These dark areas might be indicative of the presence of threat materials; however, they yield little information about the exact nature of the material to distinguish between benign and threat materials. Typical penetration depths of existing cargo inspection systems range between 200 and 400 mm of iron. This penetration depth is not sufficient for some sea cargo containers and, in particular, for rail-cargo in which cargo with higher density and longer path length is encountered. Therefore, the vast majority of cargo must be penetrated adequately to ensure proper screening.

Enhancing the penetration level of radiation such as X-rays to inspect cargo requires higher intensity sources and lower scatter. A typical problem faced while using such high energy X-ray systems is that the impact of scatter radiation becomes increasingly more significant with highly attenuating cargo. Scattered radiation is a type of unwanted signal or "noise" in the image and tends to blur and obscure the image, reducing image contrast. The degree of contrast loss in an image depends on the detected scatter. High levels of scatter radiation associated with X-ray systems results in poor image quality.

Scatter reduction can help in improving the image quality and the penetration capability of high energy X-ray radiation. A typical method used in X-ray systems to reduce scatter is collimation (via the use of collimators). However, the usefulness of the collimators is limited as they produce scatter by themselves.

X-ray radiographic systems produce images from signals detected by an array of X-ray detectors. Typically, the detectors comprise scintillating crystals that convert the X-rays to light rays and are coupled to silicon photodiodes that convert such light rays to a measureable electronic signal. The data is sampled with analog-to-digital converters (ADC) to produce a digital representation of the signal. Common ADCs used in conventional X-ray imaging systems have a resolution ranging from 16 bits to 20 bits. The use of intense sources of radiation requires higher sampling resolution to allow measuring data associated with very low signals (resulting from high X-ray attenuation) to data associated with very high signals (resulting from no or low X-ray attenuation). Some ADCs with higher resolution are available but the electronic systems associated with such ADCs produce high levels of noise that interfere with the detection of low energy X-rays and are hence not suitable in such environments especially in systems with pulsed X-ray sources. The inability to detect both low- and high-intensity X-rays significantly impairs the level of resolution detection of an imaging system.

The need for an advanced and improved X-ray imaging system is paramount to address the above challenges. Accordingly, there is need for an X-ray imaging system that is able to scan high attenuation objects in cargo without compromising the quality of an image. There is also need for an X-ray inspection system that can reduce the impact of scatter radiation and produce high level of contrast in a final output radiographic image.

Typically, in X-ray inspection systems, a high detection signal results when no cargo is present and a low detection signal results when there is highly attenuating cargo present. When the power of the inspection system source (X-ray) is increased (e.g. by 10×) to increase penetration, the high signal (corresponding to no cargo) also increases by a corresponding value (e.g. by 10×). With the increase in power, the attenuating cargo will be penetrated/detected more.

Thus, there is a need for an X-ray detection system comprising a robust electronic design and with a high dynamic range that allows for the detection of very low signals in highly attenuating cargos to very high signals from an unattenuated beam, as the source intensity is increased to increase penetration. Specifically, there is requirement for an advanced ADC system for an X-ray detection system that has low noise associated with its electronic circuit and that is capable of providing a resolution of at least 24 bits.

SUMMARY OF THE INVENTION

The present specification discloses an X-ray inspection system comprising an X-ray source and a detector for detecting transmitted X rays having a range of intensities, wherein the detector comprises: at least one crystal adapted to produce a light signal upon interacting with said X rays, said at least one crystal being coupled with at least one photodiode and at least one photomultiplier; and a processing unit coupled with the at least one crystal, wherein said processing unit is adapted to reject all detected radiation having energy levels below a predefined threshold value.

Optionally, the X-ray inspection system further comprises a current integrator coupled with the photodiode.

Optionally, the X-ray inspection system further comprises a single photon detector coupled with the photomultiplier adapted to enable energy sensitive single photon counting of the transmitted X-rays. The single photon detector may be configured to operate across multiple energy thresholds.

The X-ray source may be at least one of a pulsed source and a continuous wave source.

The photomultiplier may be a solid-state photomultiplier.

The at least one crystal may comprise at least one of a Cerium-doped Lutetium Yttrium Orthosilicate (LYSO) scintillating crystal and a lead tungstate based scintillating crystal.

Optionally, the at least one crystal comprises a non-scintillating material wherein the at least one crystal is adapted to produce light signals by Cerenkov radiation.

Optionally, the at least one crystal comprises at least one face, wherein the at least one face of said at least one crystal is coated with a wavelength shifter material for shifting Cerenkov radiation to frequencies to improve detection efficiency.

Optionally, said wavelength shifter material comprises p-terphenyl and teraphenyl-butadiene.

Optionally, the processing unit comprises at least one analog to digital converter (ADC).

The present specification also discloses an X-ray inspection system comprising an X-ray source and a detector adapted to detect transmitted X rays having a range of intensities, wherein the detector comprises: at least one crystal adapted to produce light signal upon interaction with said X rays, wherein the at least one crystal is coupled with a first photodiode having a first area and a second photodiode having a second area and wherein the first area is different that the second area; a first ADC coupled with said first photodiode and a second ADC coupled with the second photodiode; and a processing unit coupled with the first ADC and second ADC, wherein the processing unit is adapted to determine a final digital signal by using digital signals output by the first ADC, digital signals output by the second ADC, and a predefined formula.

The processing unit may select a final digital signal corresponding to a highest unsaturated signal from among the digital signals output by the first photodiode and the second photodiode.

Optionally, the processing unit comprises at least one FPGA and at least one counting register.

Optionally, the X-ray source is a high intensity source having an energy of 9 MV and power of 10 KW. Optionally, the X-ray source is one of a pulsed source and a continuous wave source.

Optionally, the second area is equal to one sixteenth of the first area and the detector further comprises a third photodiode having a third area equal to 1/256 of the first area.

Optionally, the second area is equal to 1/n of the first area and the detector further comprises a third photodiode having a third area equal to 1/m of the first area, wherein n is a number equal to or greater than 2 and less than 50, and wherein m is a number equal to or greater than 4, less than 500, and greater than n.

The present specification also discloses an X-ray inspection system comprising an X-ray source and a detector for detecting transmitted X rays having a range of intensities, wherein the detector comprises: at least one crystal for producing a light signal upon interacting with the X rays, wherein the at least one crystal is coupled with a plurality of photodiodes of varying areas and a solid state photomultiplier; at least one current integrator coupled with the plurality of photodiodes; at least one single photon detector coupled with the solid state photomultiplier and adapted to enable energy sensitive single photon counting of the transmitted X rays; and a processing unit coupled with the photomultiplier for determining a signal indicative of the transmitted X-rays based on an intensity of signals output by said plurality of photodiodes.

Optionally, the X-ray inspection system further comprises one or more ADCs coupled with said plurality of photodiodes, wherein each of said plurality of photodiodes is coupled with a distinct one of said one or more ADCs.

The processing unit may be adapted to determine a final digital signal by using digital signals output by the one or more ADCs and a predefined formula.

The aforementioned and other embodiments of the present invention shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings:

FIG. 1A illustrates a cross-sectional view of a detector array configuration, in accordance with an embodiment of the present specification;

FIG. 1B illustrates a top view of the detector array configuration, in accordance with an embodiment of the present specification;

FIG. 10 illustrates a two photodiode configuration in a radiographic detector assembly, in accordance with an embodiment of the present specification;

FIG. 11 illustrates a hybrid detector unit comprising two photodiodes and a solid state photon multiplier, in accordance with an embodiment of the present specification;

DETAILED DESCRIPTION OF THE INVENTION

Figure 2A:
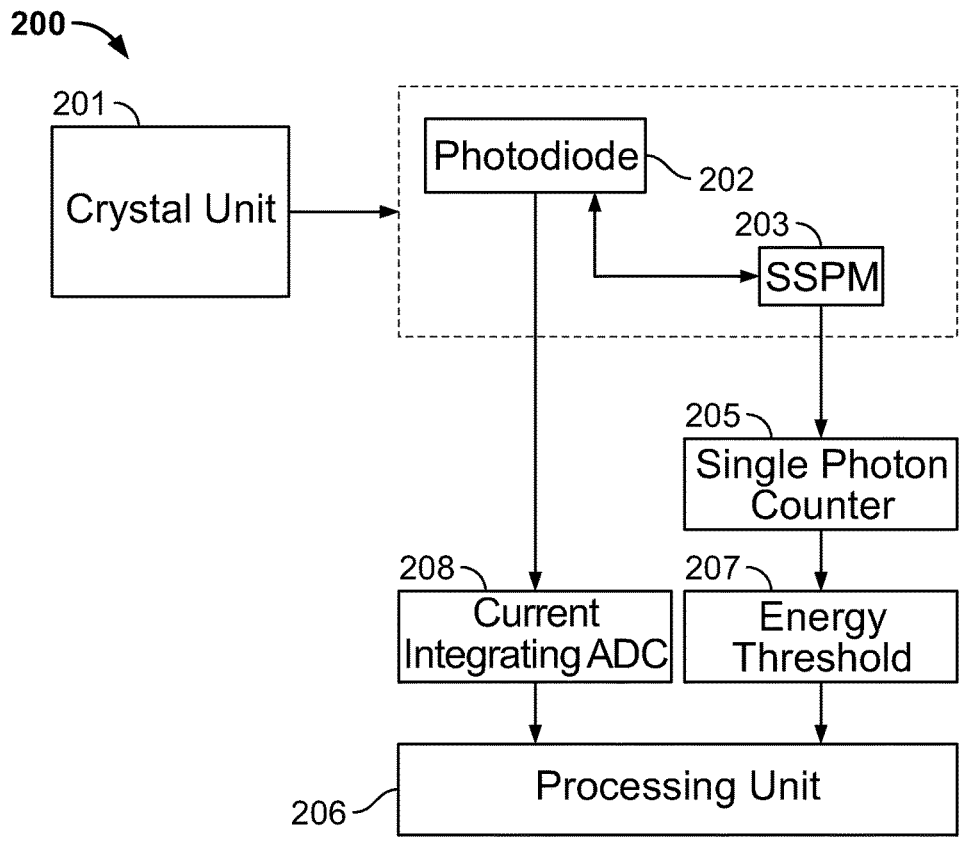
FIG. 2A illustrates a block diagram of a radiation detection system, in accordance with an embodiment of the present specification.

The present specification is directed towards systems and methods to enhance the dynamic range of operation for radiographic imaging systems such as an X-ray system. In an embodiment, the imaging system described in the present specification enables the scanning of high density cargo with sufficient penetration depth for the detection of contraband materials in dense cargos. The present specification also describes an imaging system having a high intensity X-ray source that can be used for high density cargo scanning with a lower impact of scatter radiation that is usually observed with conventional high intensity X-ray systems. The present specification also describes novel methods to reduce the effects of X-ray scatter radiation produced during radiographic imaging.

Configuring an X-ray system to reject scatter is not necessary when the X-ray transmission signal measured by the detectors is strong because, in such a case, the contrast in the image is not compromised. However, scatter radiation should be rejected for cases in which the X-ray signal transmitted through cargo is significantly lower than the scattered X rays because, in such cases, the image contrast might be compromised. Scattered radiation signal is characterized by relatively lower energy compared to that of transmitted signal as X rays lose energy in every Compton interaction. In an embodiment, the present specification describes an imaging system in which scatter radiation is reduced by using energy sensitive electronics in the detector assembly that rejects radiation below a threshold energy.

Most X-ray systems employ current-integration electronics with photodiodes that measure the total energy deposited at the detectors. However, noise associated with such electronics limits the lowest number of X-rays that can be detected (the noise is typically greater than a few X-rays). In addition, these detectors cannot distinguish between transmitted and scattered X-rays.

As is known, single-photon counting (SPC) detectors do not have noise levels above a low-energy threshold and therefore can be used for measurement of single X-rays. However, the problem with SPC-based detection is the high pileup (two or more X-rays arriving at almost same time) of signals for low to medium attenuation, in particular for sources that produce X-rays in short pulses. Therefore, SPC detectors cannot work in such cases.

In an embodiment of the present specification, a hybrid detector approach is disclosed that comprises photodiodes for high-counting rate and SPC detectors with energy sensitivity for scatter radiation rejection at low-counting rates.

In an embodiment, the present specification provides at least two methods for achieving higher penetration of X-rays, which may be used separately or in combination in X-ray inspection systems. A first method aims at increasing penetration through cargo being inspected, by increasing the power of the X-ray source. In an embodiment, the present specification provides systems and methods for increasing the dynamic range of detectors to adequately read both high and low intensity signals that result from the increase in the power of the X-ray source. In an embodiment, photodiodes with different sizes that are selected appropriately to read high and low signals are used for measuring high intensity X-rays. In another embodiment, a photodiode and a solid state photomultiplier are used in conjunction for measuring low intensity X-rays.

A second method aims at reducing scatter from the cargo being inspected. In an embodiment, scatter that falls below a predetermined energy threshold, or the low-energy X-rays that are mainly scatter, is rejected. In an embodiment, a spectroscopic analog to digital converter is used to improve rejection rates by using weighting. In another embodiment, non-scintillating crystal is used to detect Cerenkov light, as the crystal automatically rejects some of the scatter without using thresholding electronics. However, the light output is low and most of the light is produced in the UV (ultraviolet) range. Therefore, in an embodiment, a wavelength shifter is also used to shift the UV to the visible light where the solid state photomultiplier is more sensitive.

The system and method of the present specification enhances the dynamic range of operation for radiographic systems. Conventional high energy imaging systems are unable to provide high penetration capability for cargo scanning as they suffer from the lack of a robust detection system that is capable of sampling the transmitted radiation across a range of intensity levels. During cargo scanning, the transmitted radiation may have a very low-intensity level (resulting from high attenuating objects) or a very high-intensity level (resulting from low attenuating objects). Conventional high resolution ADCs cannot be used for above purpose because their dynamic range does not allow them to operate in the wide range of very low and very high signals. Conventional ADC have a range of 16 to 20 bits. However, there is a requirement for ADCs to operate in an dynamic range of 24 bits or higher. In an embodiment, the present specification describes a novel solution comprising multiple low resolution ADCs (such as 20 bit or lower resolution) to implement an effective high resolution ADC (such as 24 bit resolution and higher) which provides the dynamic range for detection of radiation across a wide range of intensity levels.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

It should be noted herein that any feature or component described in association with a specific embodiment may be used and implemented with any other embodiment unless clearly indicated otherwise.

FIG. 1A illustrates a cross sectional view of a detector assembly configuration comprising crystals, with each crystal coupled to a photodiode and a solid-sate photomultiplier and the associated electronics, in accordance with an embodiment of the present specification. As shown in FIG. 1A, the detector assembly comprises a plurality of crystals 101 such that each crystal is coupled to a solid state photomultiplier (SSPM) 103. In an embodiment directed to increase the response of the SSPM, the face of crystal coupled to the photo-sensor is coated with a wavelength shifter (WLS) material 102, as explained below. A top view of the above embodiment is shown in FIG. 1B. Each of the plurality of crystals 101 is coupled to a solid state photomultiplier 103 and a photodiode 104. The photodiodes 104 are coupled to a photodiode electronic board comprising current-integration electronics, and the solid state photo multipliers 103 are coupled to a solid state photomultiplier electronics board comprising energy-sensitive single-photon counting electronics.

FIG. 2A illustrates a block diagram of an X-ray detection system comprising a photodiode and a solid state photomultiplier coupled to a single crystal unit, in accordance with an embodiment of the present specification. In an embodiment, X-ray detection system 200 comprises an array of crystal units 201 that produce light on interaction with X-rays. In FIG. 2A, the detection system 200 corresponding to only a single crystal unit is shown. In the embodiment shown in FIG. 2A, each of the crystal units 201, is coupled to a photodiode 202 and a solid state photomultiplier (SSPM) 203. The SSPM 203 is coupled to a single photon counter (SPC) 205. The SPC 205 is configured to sample signals based on their energy level and is coupled to an energy threshold system 207. The energy threshold system 207 comprises a discriminator that rejects pulses below a specified voltage (energy) to reduce scatter radiation. A current integrating analog to digital converter (ADC) 208 converts the incoming analog data into digital signal. In an embodiment, a processing unit 206, comprising one or more chips, controls the operation of entire detection system 200.

Using high power X-ray sources to increase the penetration capability, a high-dynamic range electronics is required for measuring a wide range of transmission signals from high intensity signals to very low intensity signals. Typically, in an X-ray radiographic system, the detectors that are used for measuring the radiation comprise scintillating crystals that convert the X-rays to light rays and are coupled to silicon photodiodes that convert such light rays to a measureable electronic signal. The data is further sampled with analog-to-digital converters (ADC) to produce a digital representation of the signal. Common ADCs used in conventional X-ray imaging systems have a resolution of 16 bits or 20 bits. The use of intense sources of radiation requires higher sampling resolution to allow measuring data associated with very low signals (resulting from high X-ray attenuation) to data associated with very high signals (resulting from no or very low X-ray attenuation). ADCs with higher resolution are available but the electronic systems associated with such ADCs produce high level of noise that interfere with the detection of low energy X-rays.

The present specification provides a solution to the above problem with a novel detector configuration comprising multiple ADCs, having a resolution of 20 bits or less, that are configured together to provide a high resolution ADC system, having a resolution of 24 bits or more and suitable for detecting a wide range of transmission signals.

As previously mentioned, the scintillating crystals used in the detector assembly are typically coupled to photodiodes, which convert the light to measureable electronic signals. For a given uniform source of intensity, the output of the photodiode depends, among other parameters, on the area of the active cell in that photodiode. Therefore, photodiodes manufactured on same substrate would typically output currents proportional to their areas provided all other parameters are the same. In an embodiment of the present specification, a number of photodiodes of different areas are coupled to the same scintillating unit to increase the dynamic range of operation of the imaging system. The above configuration allows measuring a wide range of transmission signals from very low intensity signals to very high intensity signals.

In embodiments, an analog to digital converter used in detection circuits, in X-ray inspection systems, has a saturation limit above a certain threshold. In order to prevent saturation, the gain of the ADC is reduced. However, this may result in the lower intensity signals being measured with inadequate resolution. In an embodiment, two photodiodes of varying sizes where one photodiode is larger than the other, are used. Each of the two photodiodes are connected to an ADC. The smaller photodiode is used to measure high intensity signals and the larger photodiode is used to measure lower intensity signals. Both the photodiodes may be used to measure signals lying in a mid-intensity range, thereby covering the entire dynamic range. In an embodiment, a single photodiode having 24-bit resolution may be employed to measure the entire dynamic range of signals.

Figure 2B:
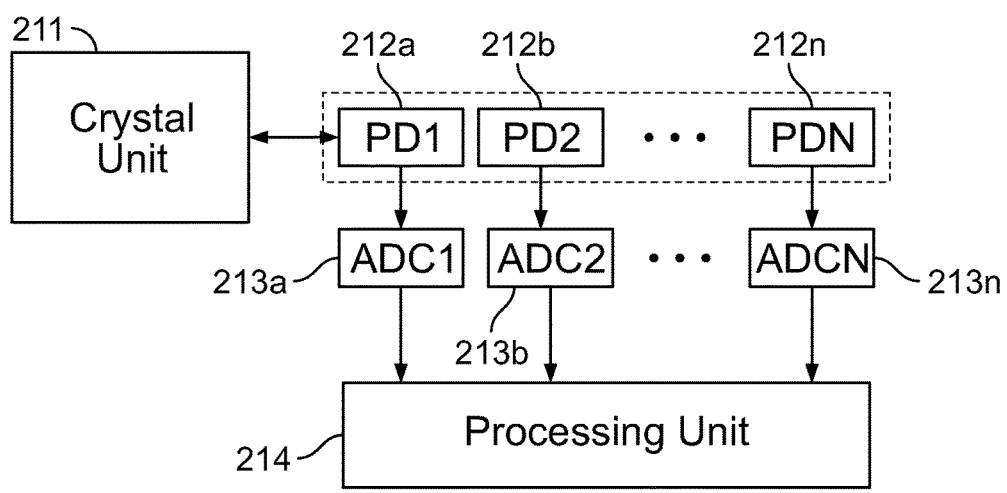
FIG. 2B illustrates a block diagram of a radiation detection system, in accordance with another embodiment of the present specification.

FIG. 2B illustrates a block diagram of an X-ray detection system comprising multiple photodiodes of different areas coupled to a single crystal unit, in accordance with an embodiment of the present specification. As shown in FIG. 2B, each crystal unit 211 in an array of crystal units present in the detector assembly is coupled to multiple photodiodes 212a, 212b . . . 212n of different areas to enhance the dynamic range of operation for the inspection system. In an embodiment, each of the photodiode 212a, 212b . . . 212n is coupled to a separate analog to digital converter 213a, 213b . . . 213n respectively. In some embodiments, a processing unit 214 controls the operation of entire detection system. As the output current generated in each photodiode is proportional to the area of active cell in that photodiode, it enables the electronics system to detect a wide range of transmission signals starting from a very low intensity signal to a very high intensity signal. Therefore, the above configuration involving multiple photodiodes of varying areas coupled to single scintillating unit enhances the dynamic range of operation of the detection system.

In another embodiment of the present specification, the crystal unit shown in FIG. 2B is also coupled to a solid state photomultiplier. In an embodiment, the solid state photomultiplier is also coupled to a single photon counting (SPC) electronics which is configured to sample signals based on their energy levels. In embodiments, the solid state photomultiplier is used only when the counting rate of the sampled signals is low and electron pileup is not significant. In an embodiment, the SPC electronics is used to reject signal below a threshold energy to reduce the impact of scatter radiation.

Figure 3A:
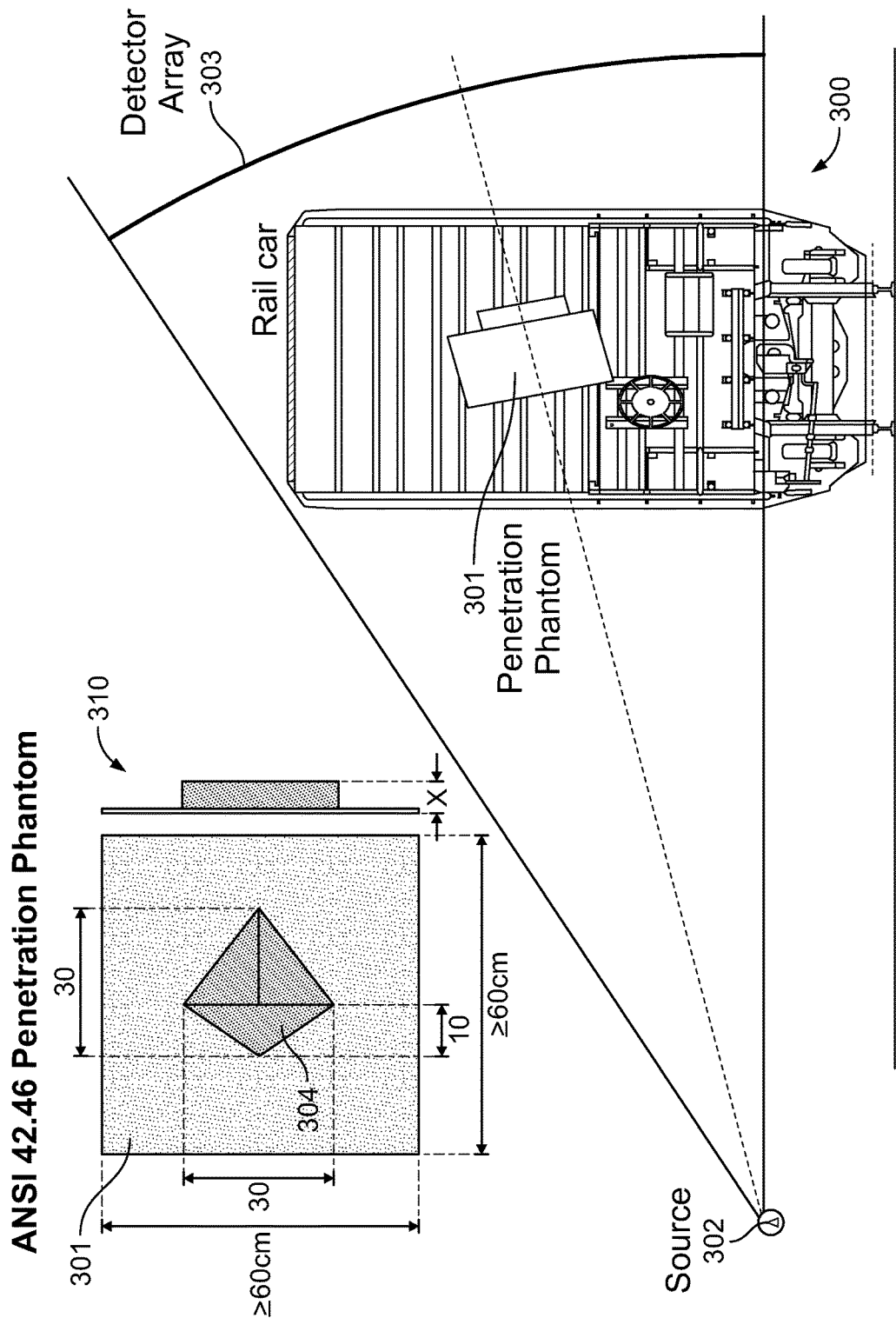
FIG. 3A is an exemplary illustration in which the imaging system of the present specification is used for scanning an ANSI 42.46 standard penetration phantom object.

FIG. 3A is an exemplary illustration in which the imaging system of the present specification is used for scanning an ANSI 42.46 standard penetration phantom object. As shown in FIG. 3A, a rail cargo container 300 comprises an ANSI 42.46 penetration phantom object 301 placed inside it. The ANSI 42.46 standard penetration phantom object 301 is used for assessing the penetration capability of high-energy radiographic systems and comprises a rectilinear iron block 60 cm×60 cm or larger, with an arrow of rhomboidal shape having a thickness 20% of the block placed behind it. A successful ANSI test of penetration for an X-ray system is based on assessing the capability of that X-ray system in determining the direction of the rhomboidal shaped arrow in the detected image. As shown in FIG. 3A, the phantom object 301 is placed at the center of rail-cargo container 300 and is tilted towards X-ray source 302. An array of X-ray detectors 303 is configured to detect the X-rays transmitted through the object 301. Image 310 shown on top left side of FIG. 3A depicts a typical configuration of ANSI 42.46 standard penetration phantom object 301 having an approximate rhomboidal shape arrow 304 of the same material placed behind it.

Figure 3B:
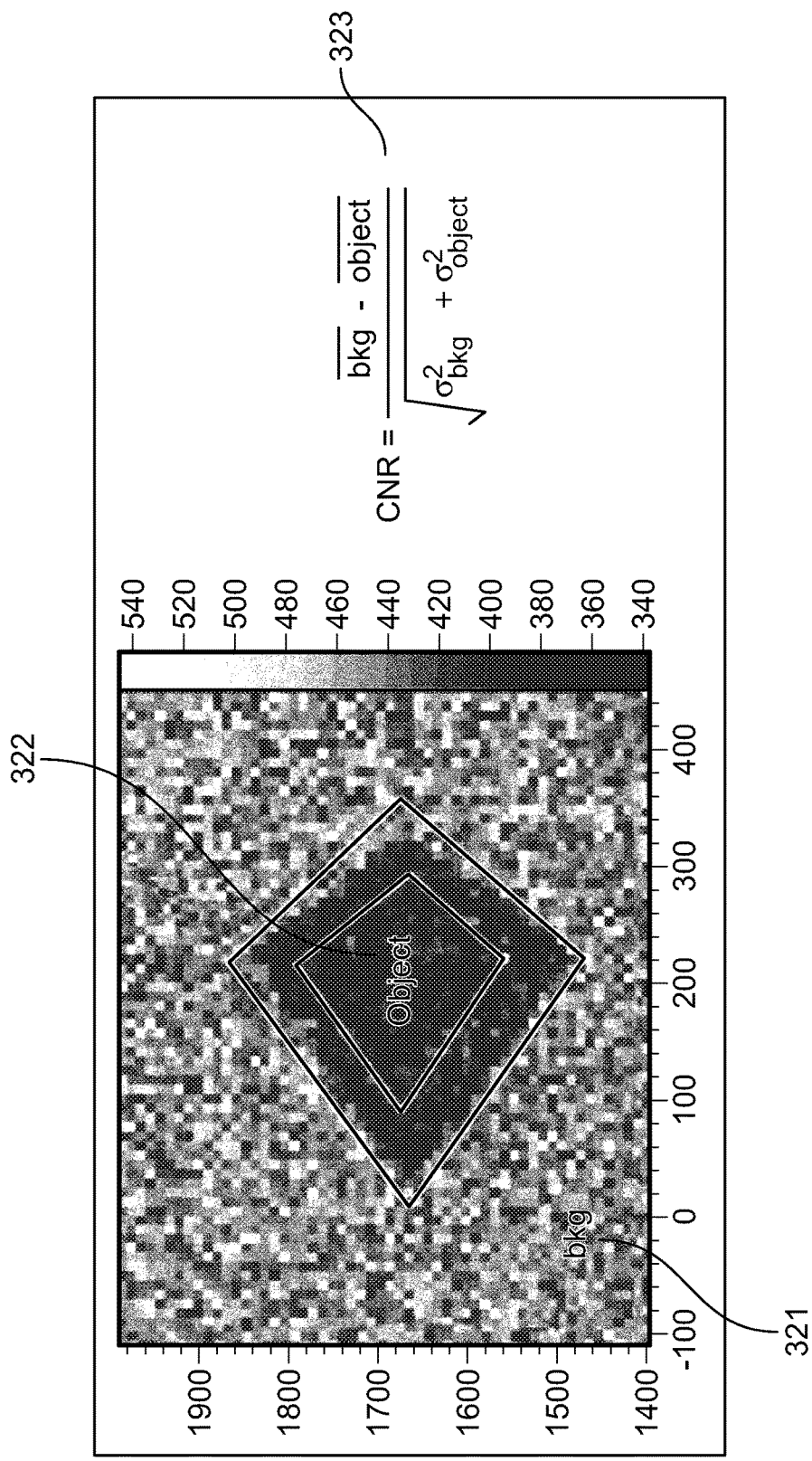
FIG. 3B illustrates a method of calculating Contrast to Noise Ratio (CNR) in radiographic images.

A typical method to determine penetration capability of an X-ray system is to compute the Contrast-to-Noise ratio (CNR) of the X-ray image of the penetration phantom such as the ANSI 42.46 phantom object depicted in FIG. 3A. FIG. 3B illustrates a method of calculating Contrast-to-Noise ratio (CNR) of the X-ray image of the penetration phantom such as the ANSI 42.46 phantom object depicted in FIG. 3A. In the calculation shown in FIG. 3B, the term object refers to the average signal counts detected over rhomboidal arrow object 322 placed behind the penetration phantom and the term bkg (or background) refers to the average signal counts detected outside the rhomboidal arrow object 322 which corresponds to the signals captured in the background region 321. In an embodiment, the edge region of the arrow object 322 is not used in the calculation of CNR. The term a refers to the standard error of the corresponding object and background signals. As shown in FIG. 3B, the mathematical formula 323 to calculate CNR is:

$$CNR = \frac{\overline{bkg} - \overline{object}}{\sqrt{\sigma_{bkg}^2 + \sigma_{object}^2}}$$

Since, CNR is an indicator of the visibility of an object in an image, a higher CNR indicates a higher likelihood of passing the ANSI penetration test.

Figure 4A:
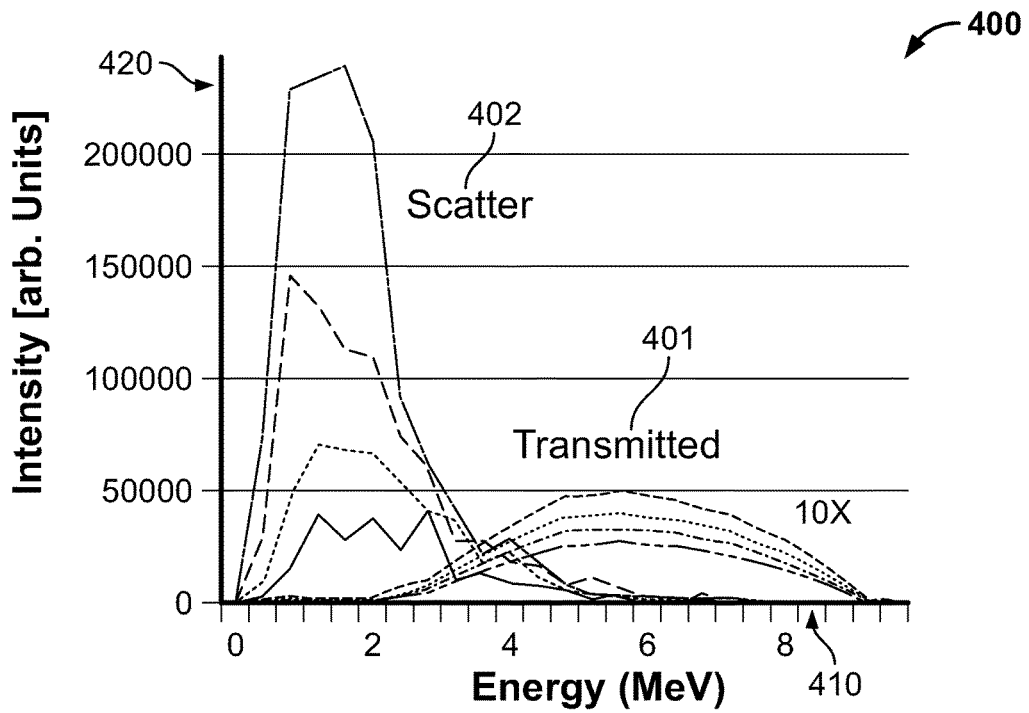
FIG. 4A illustrates a typical energy spectrum distribution for scattered and transmitted radiation produced during the ANSI test of a standard penetration phantom object shown in FIG. 3A for various thicknesses.

FIG. 4A illustrates a typical energy spectrum distribution 400 for scattered and transmitted radiation produced during the ANSI test of a standard 60 cm penetration phantom object shown in FIG. 3A for various configurations. Horizontal axis 410 depicts the energy of both transmitted and scattered radiation and vertical axis 420 depicts intensity of the radiation. As shown in the energy spectrum distribution 400, transmitted radiation 401 has higher energy compared to the scattered radiation 402. Also, intensity level of transmitted radiation 401 is typically lower as compared to that of scattered radiation 402 for various configurations as shown.

Figure 4B:
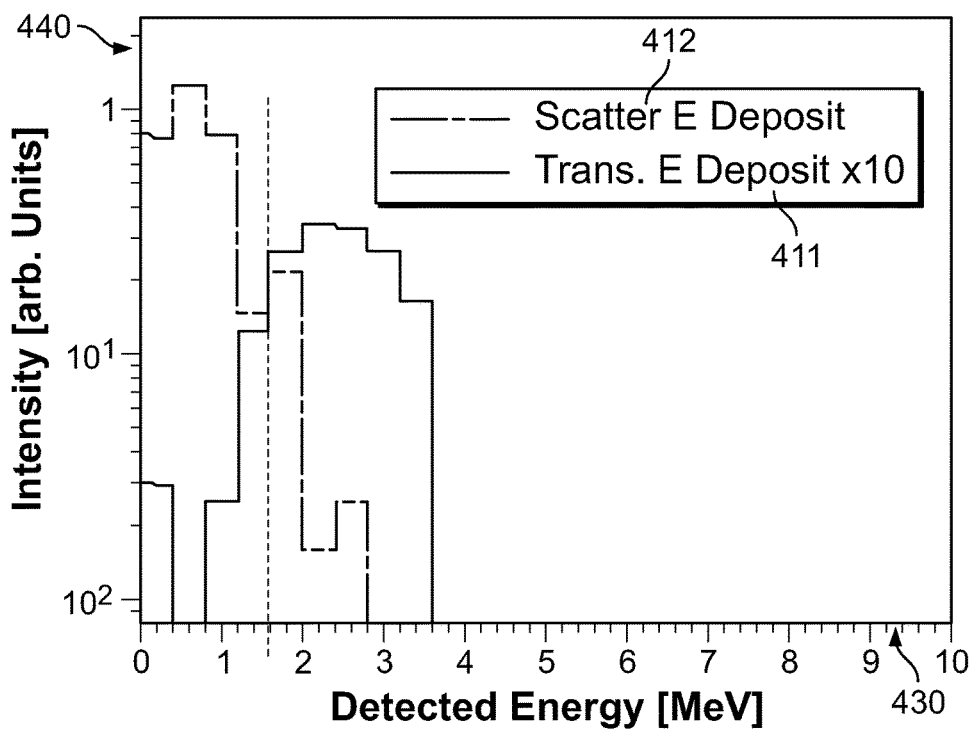
FIG. 4B illustrates a typical spectra of X-rays detected during the ANSI test of a standard penetration phantom object shown in FIG. 3A.

FIG. 4B illustrates the typical spectra of X-rays detected during the ANSI test of a standard penetration phantom object shown in FIG. 3A. Horizontal axis 430 depicts the energy spectra of both transmitted and scattered radiation detected by the detector assembly and vertical axis 440 depicts the intensity of the radiation. One of ordinary skill in the art can appreciate that the most common detectors used in radiographic systems consist of scintillating crystals that convert X-ray energy to light. These detectors do not accurately record the incident energy as X-rays deposit partial energy due to escaping Compton-scattered X-rays interacting in the detectors. Therefore, as illustrated in FIG. 4B, the energy of the detected X-rays shift to a lower value compared to the actual energy produced during the scanning process. This change is illustrated in FIG. 4B, wherein the energy of the detected transmission radiation 411 has shifted significantly to lower levels (compared to the actual energy of transmitted radiation shown in FIG. 4A). Similarly, the energy of the detected scattered radiation 412 has also shifted to lower values (compared to the actual energy of scattered radiation shown in FIG. 4A).

In an embodiment, the present specification describes a unique method to reduce the scatter radiation in which an energy threshold is used to reject all radiation having energy below that specific threshold value. From the graphs illustrated in FIG. 4A and FIG. 4B, it is clear that the transmitted radiation has a relatively higher energy spectrum compared to scattered radiation. Therefore, in an embodiment, when the radiation below a specific energy threshold is rejected, the relative proportion of transmitted signals in the detected radiation spectrum significantly increases as compared to the proportion of scattered radiation. The rejection of scattered radiation in the above embodiment leads to a superior CNR ratio which improves the overall image quality.

Figure 5:
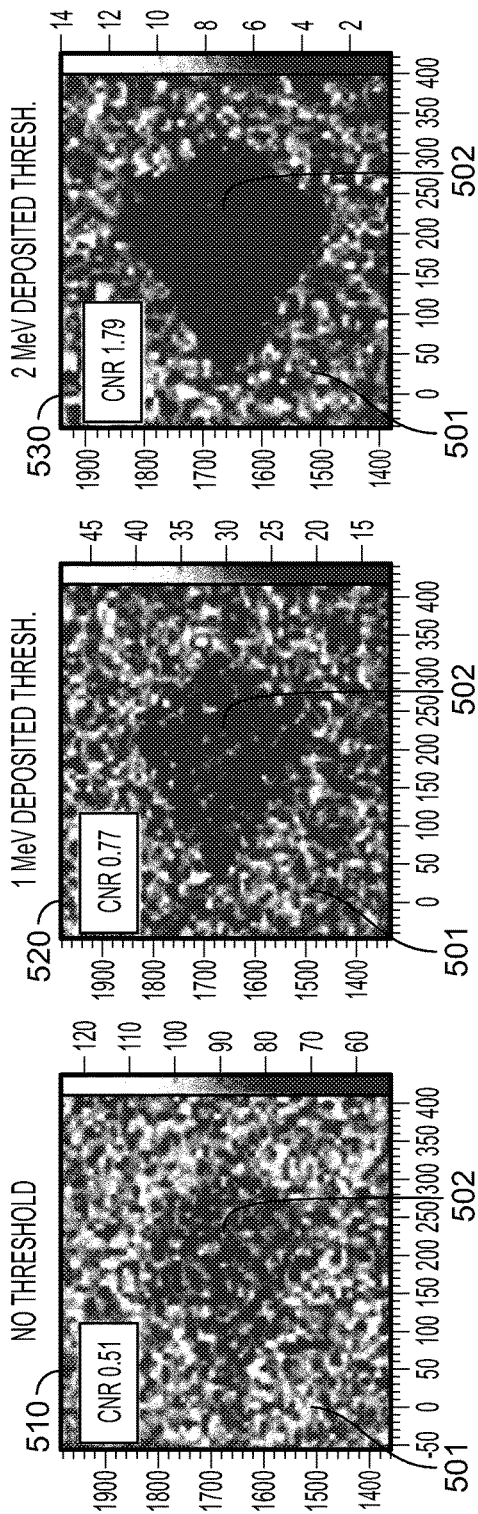
FIG. 5 illustrates images of ANSI 42.46 penetration phantom obtained with a 10 MeV-10 kW Linac single-photon counting detectors for various energy thresholds, in accordance with an embodiment of the present specification.

FIG. 5 illustrates the images for ANSI 42.46 penetration phantom obtained with a 10 MeV-10 kW linac single-photon counting detectors for various energy thresholds, in accordance with an embodiment of the present specification. In image 510 of FIG. 5, no energy threshold is employed, meaning that the entire incident scattered and transmitted radiation is detected and included in the final signal used for image formation. As shown in image 510, with no specific energy threshold, CNR is very low at 0.51 and the image quality is poor as it is almost impossible to distinguish the rhomboidal shaped arrow object 502 in the standard penetration phantom image 501.

In an embodiment as shown in image 520 of FIG. 5, an energy threshold of 1 MeV is used for ANSI testing of standard penetration phantom as shown in FIG. 3A. Using an energy threshold of 1 MeV implies that a significant proportion of the scattered radiation is rejected by the detector and does not form the part of final signal used for image formation. The resultant final signal comprises a higher proportion of transmitted radiation leading to a better quality picture. As shown in image 520, using an energy threshold of 1 MeV, a CNR of 0.77 is achieved and rhomboidal shaped arrow object 502 is visible more clearly as compared to the image 510.

In another embodiment shown in image 530 of FIG. 5, an energy threshold of 2 MeV is used for ANSI testing of standard penetration phantom as shown in FIG. 3A. Using an energy threshold of 2 MeV implies that all radiation below an energy of 2 MeV is rejected by the detector. A significant proportion of the low energy radiation comprises the scattered radiation which do not form the part of final signal used for image formation. The resultant final signal comprises a higher proportion of transmitted radiation leading to a better quality picture. As shown in image 530, using an energy threshold of 2 MeV, a CNR of 1.79 is achieved and rhomboidal shaped arrow object 502 has much higher visibility as compared to image 510 or image 520.

Hence, as shown in FIG. 5, CNR increases from 0.51 to 0.77 with a 1-MeV energy threshold and to 1.79 with a 2-MeV energy threshold. In various embodiments, increasing the energy threshold further does not result in a further CNR gain as with higher energy thresholds, the transmitted signals also get rejected.

In an embodiment, the present specification describes a novel method for enhancing the range of radiographic systems by using an energy threshold and energy weighting across the energy spectrum. In an embodiment, an energy threshold is used to reject low energy scatter radiation and the detected spectrum is weighted to provide higher significance to high energy radiation which predominately comprises the transmitted signal.

Figure 6:
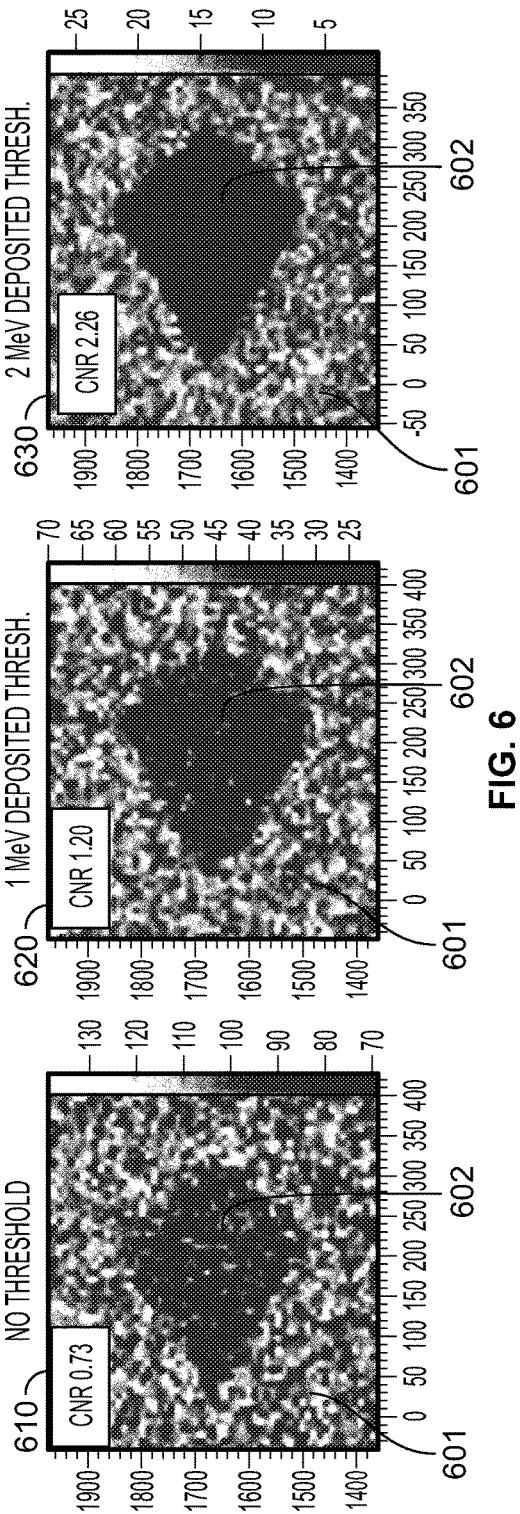
FIG. 6 illustrates images for ANSI 42.46 penetration phantom obtained with a 10 MeV-10 kW Linac single-photon counting detectors using a weighted average method for various energy thresholds, in accordance with an embodiment of the present specification.

FIG. 6 illustrates the images for ANSI 42.46 penetration phantom obtained with a 10 MeV-10 kW linac single-photon counting detectors using an energy weighting method for various energy thresholds, in accordance with an embodiment of the present specification. In image 610 of FIG. 6, no energy threshold is used, hence all incoming scattered and transmitted radiation is detected and included in the final signal used for image formation. In accordance with an embodiment, the detection system uses energy weighting of the spectrum in the above scanning process implying that high energy radiation is given more significance in comparison to the low energy signals, and as a result the final signal which is used for image formation has significantly higher proportion of transmitted radiation as compared to the signal which is used in corresponding image 510 shown in FIG. 5. As shown in image 610, with no specific energy threshold and with energy weighting, the CNR is relatively better at 0.73 as compared to the CNR obtained in image 510 shown in FIG. 5. With a CNR of 0.73, the image quality is still poor as it is not easy to distinguish the rhomboidal shaped arrow object 602 in the standard penetration phantom image 601.

As shown in image 620, using a threshold of 1 MeV and with weighted average spectrum formation, the CNR is relatively better at 1.20 compared to a CNR of 0.77 obtained in corresponding image 520 of FIG. 5. In absolute terms, a CNR of 1.2 provides a better view and the rhomboidal shaped arrow object 602 is significantly visible in image 601.

As shown in image 630, using a threshold of 2 MeV and with weighted average spectrum formation, the CNR is relatively better at 2.26 compared to a CNR of 1.79 obtained in corresponding image 530 of FIG. 5. The image quality obtained with a CNR of 2.26 as shown in image 630 is visible and very clear.

Using high power X-ray sources to increase penetration capability also requires measuring transmission signals over a wide range of intensities. Typically, in an X-ray radiographic system, detectors used for measuring radiation comprise scintillating crystals for converting X-rays to light rays, and are coupled to silicon photodiodes that convert the light rays to a measureable electronic signal. The electronic signal is further sampled with analog-to-digital converters (ADC) to produce a digital representation of the signal. Common ADCs used in conventional X-ray imaging systems have a resolution of 16 bits or 20 bits. The use of intense sources of radiation requires higher sampling resolution to allow measuring data associated with very low signals (resulting from high X-ray attenuation) as well as data associated with very high signals (resulting from very low X-ray attenuation). ADCs with higher resolution are available but the electronic systems associated with such ADCs produce high levels of noise that interfere with the detection of low energy X-rays, and are hence, not preferred. The inability to detect low intensity X-rays significantly impacts the penetration capability resulting in dark areas in the image with little or no information of the scanned area.

The present specification provides a solution to the above problem with a novel electronic system comprising multiple conventional ADCs that are configured together to provide a high resolution ADC system suitable for detecting a wide range of transmission signals.

For a given uniform source of intensity, the output of photodiode depends, among other parameters, on an area of an active cell in that photodiode. Therefore, photodiodes manufactured on the same substrate would typically output currents proportional to their areas, provided all other parameters are the same. In an embodiment of the present specification, a number of photodiodes of different areas are coupled to the same scintillating unit to increase the dynamic range of operation of the imaging system; thereby allowing measurement of transmission signals over a wide range of intensities.

Figure 7:
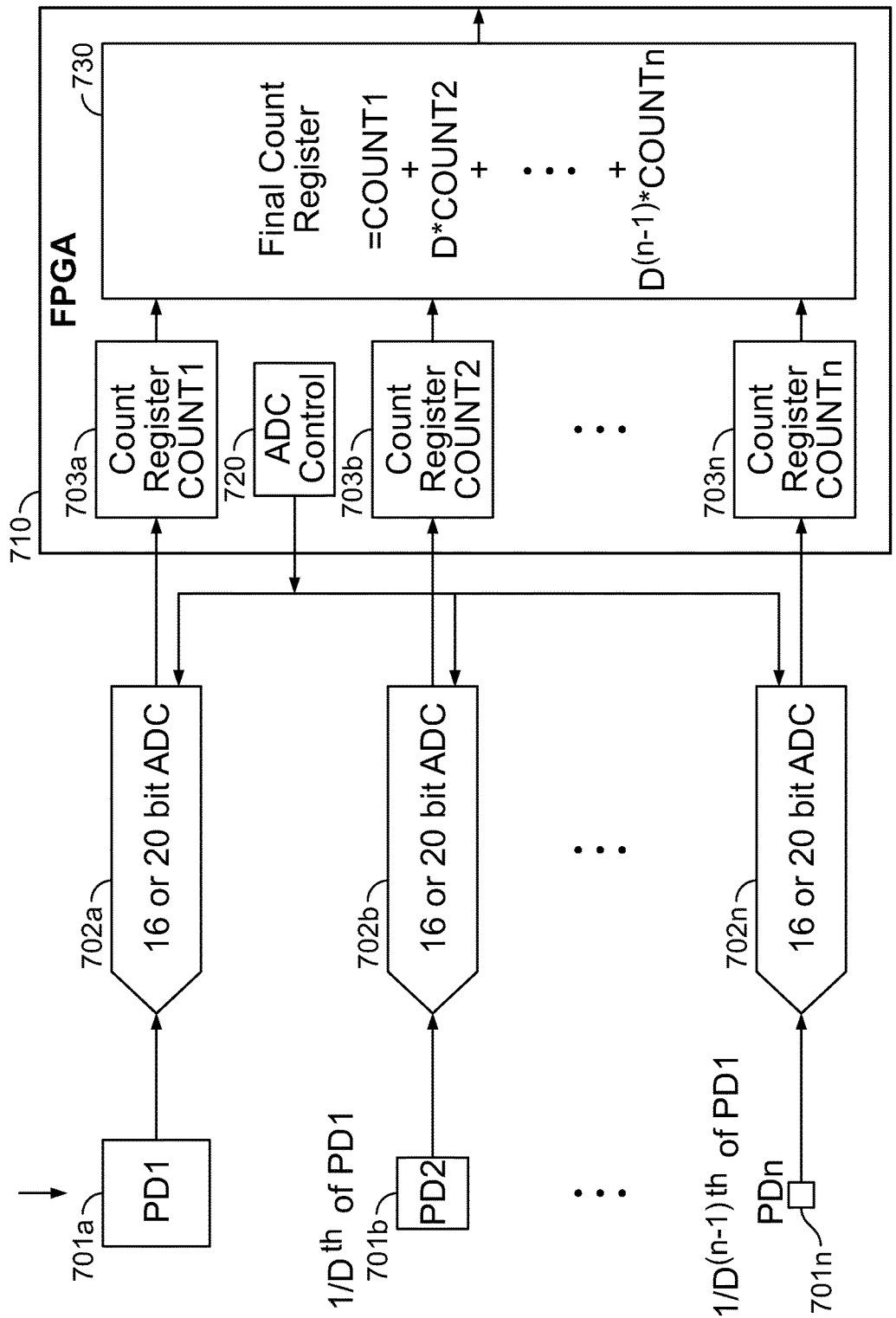
FIG. 7 illustrates a detector assembly comprising multiple photodiodes of varying areas coupled to the same scintillating unit, in accordance with an embodiment of the present specification.

FIG. 7 illustrates an electronics system comprising multiple photodiodes of varying areas coupled to the same scintillating unit in a radiation detector assembly, in accordance with an embodiment of the present specification. In FIG. 7, a plurality of photodiodes 701a, 701b . . . 701n are coupled to the same scintillating unit (not shown in FIG. 7) in the detector assembly and hence correspond to a single pixel on a final radiation image. In an embodiment, the system is configured such that the photodiodes 701a, 701b . . . 701n have varying areas starting from a large area photodiode to a very small area photodiode. As the output current generated in each photodiode is proportional to the area of active cell in that photodiode, it enables the electronics system to detect a wide range of transmission signals. For example, in case the incoming signal is very small, it may not trigger output current in small area photodiodes but it might trigger output current in at least one of the large area photodiodes. Similarly, in case the incoming signal is large, it may trigger very high current in large area photodiodes which might be beyond the saturation limit of the ADC coupled to it, but the signal may be detected by one of the small area photodiodes. Therefore, the configuration illustrated in FIG. 7 enhances the dynamic range of operation of the detection system. In an embodiment, the area of nth photodiode 701n is configured as $1/D^{(n-1)}$ times the area of first photodiode 701a, wherein D is a constant. As an example, if D is equal to 16, the area of second photodiode 701b would be $1/16$ times the area of the first photodiode 701a, and the area of third photodiode 701c would be $1/256$ times the area of the first photodiode 701a. It should be appreciated that D can be any number, or fraction thereof, greater than 0.

In an embodiment, each of the photodiode 701a, 701b . . . 701n is coupled to a separate ADC (analog to digital converter) 702a, 702b . . . 702n respectively. The ADCs detect the analog current generated in the respective photodiode and convert the same into digital format. In an embodiment, each of the ADCs 702a, 702b . . . 702n is coupled to a separate count register 703a, 703b . . . 703n configured in a field programmable gate array (FPGA) 710 for storing the digital value of the signal sampled by the respective ADC. Each of the count registers 703a, 703b . . . 703n is further coupled to a final count register 730 in FPGA 710 for storing the final digital value of the incoming signal. In some embodiments, the final count register 730 calculates the value of incoming signal as per the following formula:

Final count=Count 1+$D$*Count 2 ... +$Dn$−1*Count $N$, wherein Count $N$ is the value of signal in count register 703$n$.

In other embodiments, the final signal is based on the output of the largest photodiode that does not saturate. In some embodiments, the FPGA 710 also comprises an ADC control unit 720 which controls the operation of all the ADCs 703$a$, 703$b$ ... 703$n$ maintaining each ADC in its respective signal range while also configuring gain for the respective signal and also providing timing signals to each ADC.

Figure 8:
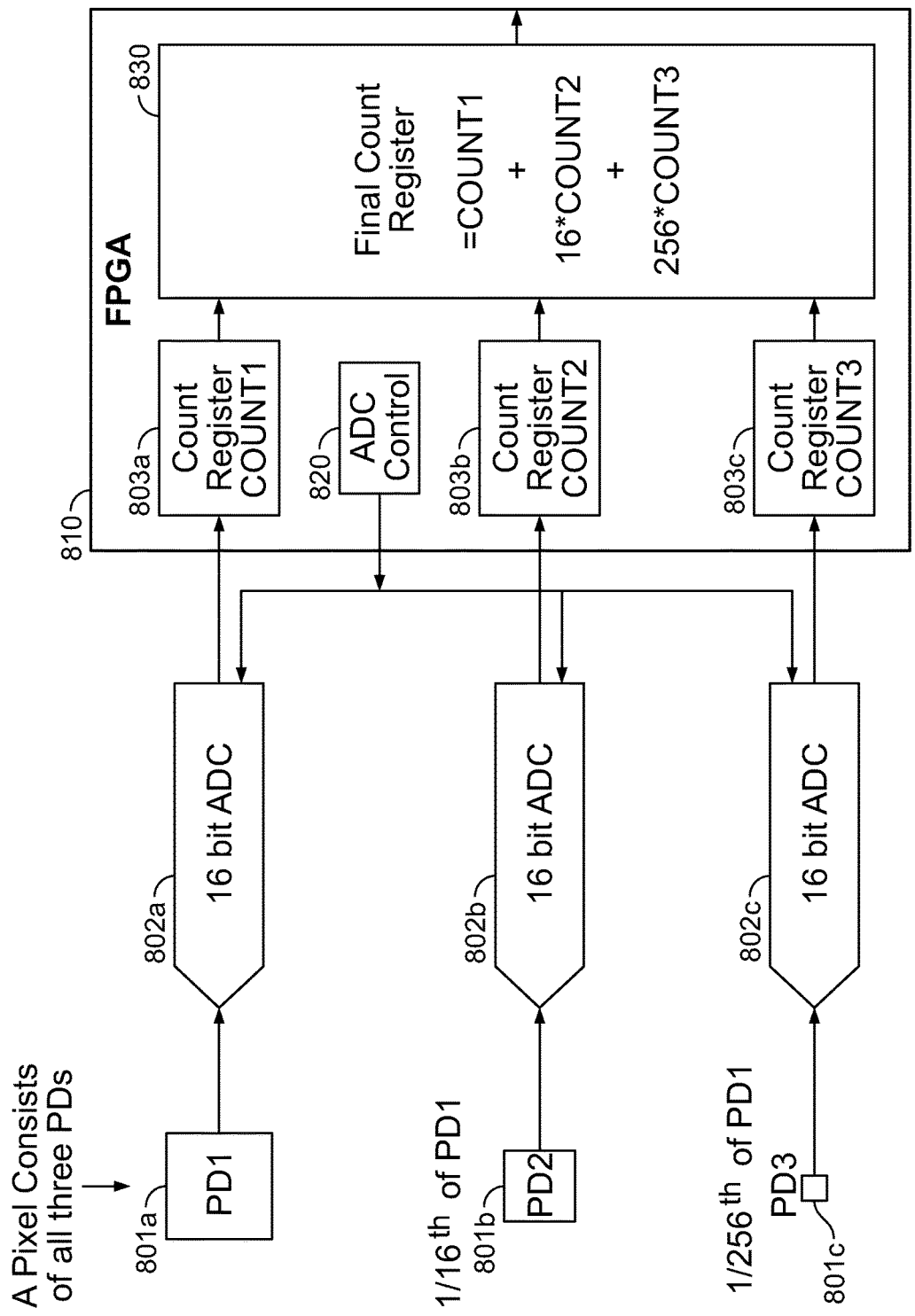
FIG. 8 illustrates a detector assembly comprising three photodiodes of varying areas coupled to the same scintillating unit, in accordance with an embodiment of the present specification.

FIG. 8 illustrates an electronics system comprising three photodiodes of varying areas coupled to the same scintillating unit in a radiation detector assembly, in accordance with another embodiment of the present specification. In FIG. 8, three photodiodes 801$a$, 801$b$ and 801$c$ are coupled to the same scintillating unit (not shown in FIG. 8) in the detector assembly and hence, correspond to a single pixel in a final radiation image obtained. In an embodiment, each of the photodiode 801$a$, 801 and 801$c$ is coupled to a separate ADC (analog to digital converter) 802$a$, 802$b$ and 802$c$ respectively, that samples the analog current generated in the respective photodiode and converts the same into digital format. In an embodiment, each of the ADCs 802$a$, 802$b$ and 802$c$ is coupled to a separate count register 803$a$, 803$b$ and 803$c$ configured in an FPGA 810 for storing the digital value of the signal sampled by the respective ADC. Each of the count registers 803$a$, 803$b$ and 803$c$ is further coupled to a final count register 830 in FPGA 810 that stores the digital value that corresponds to the incoming signal. In some embodiments, the FPGA 810 also comprises an ADC control unit 820 which controls the operation of all the ADCs 802$a$, 802$b$ and 802$c$ maintaining their respective signal ranges while also configuring gain for the respective signals and also providing timing signals to each ADC.

In an embodiment, the system is configured such that the photodiodes 801$a$, 801$b$ and 801$c$ have varying areas starting from a large area photodiode 801$a$ to a small area photodiode 801$c$. In an embodiment, the area of photodiode 801$b$ is $1/16^{th}$ times the area of photodiode 801$a$ and the area of photodiode 801$c$ is $1/256$ times the area of photodiode 801$a$. The above configuration involving multiple photodiodes of varying areas coupled to single scintillating unit enhances the dynamic range of operation of the detection system.

As the intensity of incoming signal increases, the ADC coupled to photodiode 801$a$ would reach its saturation limit before the ADCs coupled to photodiodes 801$b$ and 801$c$, and so on. In an embodiment, in case none of the ADCs coupled to the photodiodes saturate, the signal from the largest photodiode is selected as it has the highest sampling resolution. If one of the ADC coupled to the photodiodes saturates, the photodiode with largest intensity will be used.

The embodiment described in the present specification enables the detection system to reliably detect a wide range of transmission radiation using conventional 16 or 20 bit ADCs without any noise or interference that is usually seen in detection systems with 24 bit or higher resolution ADCs.

In an embodiment, the ADCs 802$a$, 802$b$ and 802$c$ have 16 bit resolution and using the above mentioned configuration of photodiodes with area A, A/16 and A/256, the system effectively achieves a 24 bit resolution.

Figure 9C:
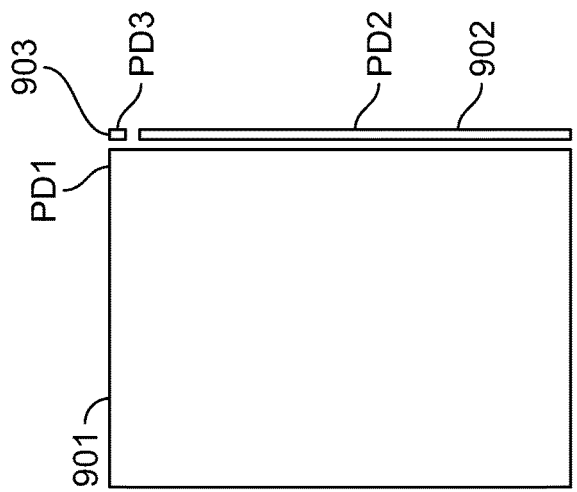
FIG. 9C illustrates a third configuration of arranging the three photodiode structures described in FIG. 8, in accordance with an embodiment of the present specification.
Figure 9B:
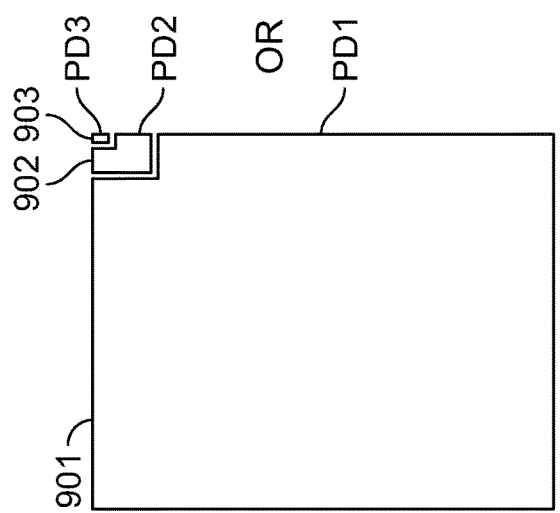
FIG. 9B illustrates a second configuration of arranging the three photodiode structures described in FIG. 8, in accordance with an embodiment of the present specification.
Figure 9A:
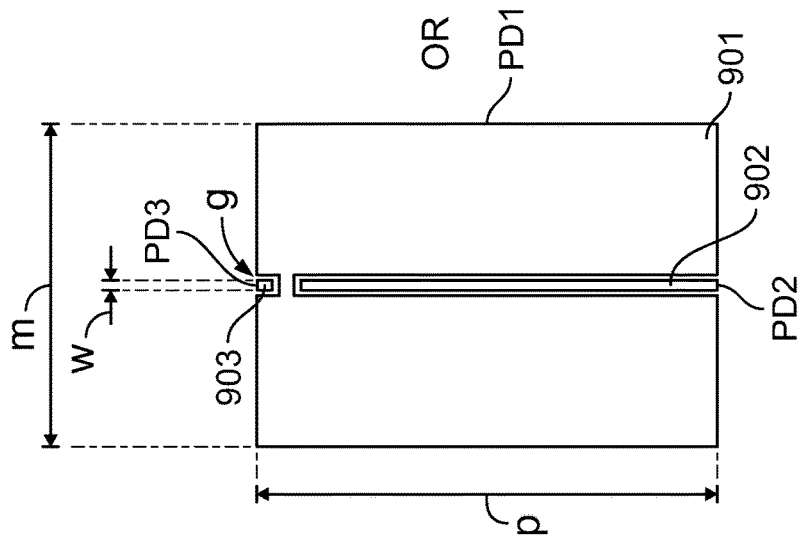
FIG. 9A illustrates a first configuration of arranging the three photodiode structures described in FIG. 8, in accordance with an embodiment of the present specification.

Multiple photodiodes coupled to a single scintillating unit may be arranged in various configurations. FIG. 9A, FIG. 9B and FIG. 9C respectively illustrate different configurations to arrange the three photodiodes illustrated in FIG. 8.

In the embodiments shown in FIG. 9A, FIG. 9B and FIG. 9C, the photodiodes 901, 902 and 903 have relative areas as A, A/16 and A/256 respectively (wherein A represents the area of photodiode 901). The relative areas may also be described as A, A/n, and A/m, where n is a number equal to or greater than 2 and less than 50; and where m is a number equal to or greater than 4, less than 500, and greater than n.

In FIG. 9A, p represents a pitch of the photodiode 901 and m represents the length of the photodiode 901, while w represents the length of photodiode 903 and g represents the gap between sides of photodiode 901 and photodiode 903. In some embodiments the length m can be same as p, but it can be increased in order to compensate for the active area loss due to the division gap g or due to any limitation of minimum w that can be achieved in a photodiode production. In an embodiment of the present specification, length m is kept in a range between ten times to twenty times of w and the gap g is configured to be half of w or less to compromise between crosstalk results and minimum active area.

Since all the three photodiodes 901, 902 and 903 are constructed with the same process and have a common cathode, the resultant current from each of them is proportional to their area for a given source of incidence (neglecting the difference in the capacitance) which is in an embodiment, 1, $1/16$, and $1/256$.

FIG. 10 illustrates a placement technique for a two photodiode configuration in a radiographic detector assembly, in accordance with an embodiment of the present specification. As shown in FIG. 10, two photodiodes 1001 and 1002 are coupled to a single scintillating unit (not shown in the FIG.) and represent a single pixel of the image. In FIG. 10, p represents a pitch of the photodiode 1001 and m represents the length of the photodiode 1001, while w represents the length of photodiode 1002 and g represents a gap between sides of photodiode 1001 and photodiode 1002. In some embodiments, the length m can be same as p, but it can be increased in order to compensate for the active area loss due to the division gap g or due to any limitation of minimum w that can be achieved in a photodiode production. In an embodiment of the present specification, length m is kept in a range between ten times w to twenty times w and the gap g is configured to be half of w or less to compromise between crosstalk results and minimum active area. In an embodiment, to achieve a 24 bit resolution, a structure comprising two photodiodes with areas A and A/16 is used and each of the photodiode is coupled to a 20 bit ADC.

In an embodiment, the present specification describes a novel hybrid detector comprising a plurality of photodiodes to enhance the effective dynamic range of operation and a solid state photomultiplier to reject scatter radiation. FIG. 11 illustrates a hybrid detector unit comprising two photodiodes and a solid state photon multiplier, in accordance with an embodiment of the present specification. As shown in FIG. 11, photo detection unit 1100 comprises two independent photodiodes 1101 and 1102 along with a solid state photon multiplier (SSPM) 1103. The photodiodes 1101 and 1102 and the SSPM 1103 are coupled to a single scintillating unit in a radiation detector assembly and represent a single pixel on a final radiation image. In an embodiment, the solid state photon multiplier 1103 aids the scatter rejection capability of the radiation detector assembly. In another embodiment, the detector assembly is configured such that the two photodiodes 1101, 1102 are connected to a single crystal unit (not shown) and the SSPM 1103 is coupled to an adjacent crystal unit (not shown).

The light-producing crystals used in a radiation detector assembly should ideally have a fast response to reduce pileup of signals when two or more signals arrive within a single time response of the detectors, thereby making them undistinguishable by the detectors. Using Continuous-Wave (CW) X-ray sources reduces the pileup, as the radiation is spread in time, unlike with pulse Linacs (Linear Accelerator) X-ray sources where the X-rays are produced in microsecond pulses with long periods of no radiation. In an embodiment of the present specification, fast scintillators developed from materials such as lead tungstate (response time ~8 ns) are used along with pulsed Linacs X-ray sources.

In another embodiment, faster response is obtained with non-scintillating crystals that produce light only through Cerenkov radiation. In case of such non-scintillating crystals, there is an added advantage of intrinsic scatter rejection as Cerenkov radiation is only produced by electrons with speeds higher than the speed of light of the crystal. However, Cerenkov radiation results in a low light output of only ~200 photons/MeV and most of the radiation is the ultraviolet (UV) range, which is not a good match for the SSPM. In an embodiment of the present specification directed towards increasing the response of SSPM, the face of crystal coupled to the light sensors is coated with a wavelength shifter (WLS). The WLS shifts the UV light towards visible light spectrum thereby increasing the efficiency of the SSPM. In another embodiment directed towards cases in which the crystal absorbs some of the UV light, all the faces of the crystal are coated with a WLS film to shift the wavelength.

In an embodiment of the present specification P-terphenyl (PT) or teraphenyl-butadiene (TBP) films are used as wavelength shifters to extend the measurable range of photons into the UV region and enhance the radiation detection system response. In other embodiments, various other WLS materials may be used.

Figure 12A:
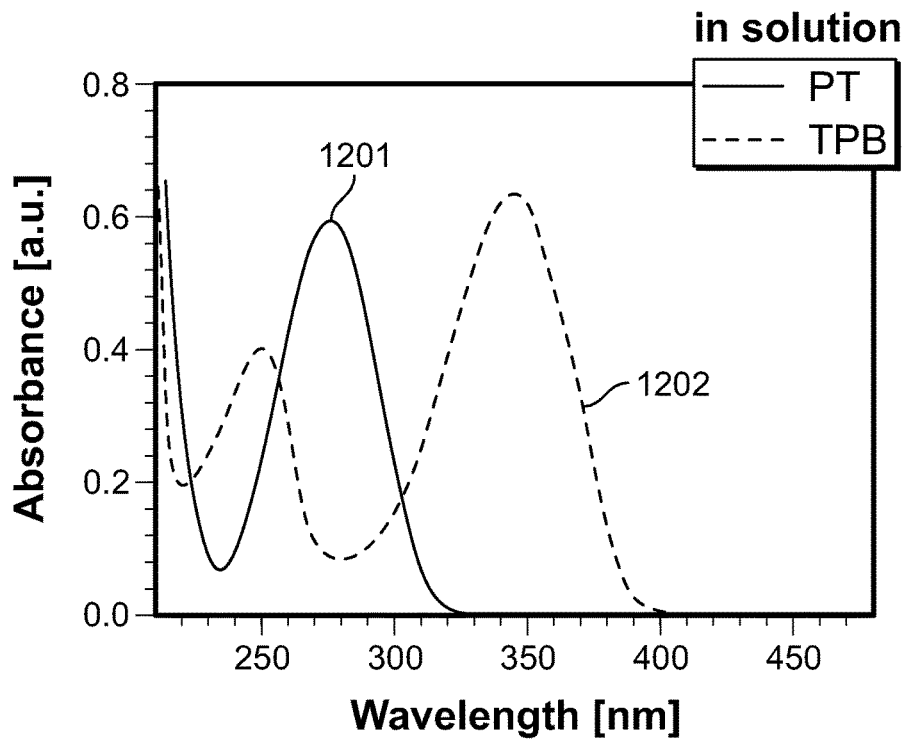
FIG. 12A illustrates an absorption spectra of p-terphenyl and TBP film coated wavelength shifters.

FIG. 12A illustrates the absorption spectra of PT and TBP film coated photon multipliers measured in a specific solution. In FIG. 12A, 1201 represents the absorption spectrum for a PT film and 1202 represents the absorption spectrum for a TBP film. As shown in FIG. 12A, quantum efficiency of a PT film based WLS 1201 is better than the TPB film based WLS 1202 for incident wavelengths ranging from 250 nm to 300 nm; and the absorption efficiency of the TPB film based WLS 1202 is higher with respect to incident wavelengths lying in the range of 300 nm to 400 nm.

Figure 12B:
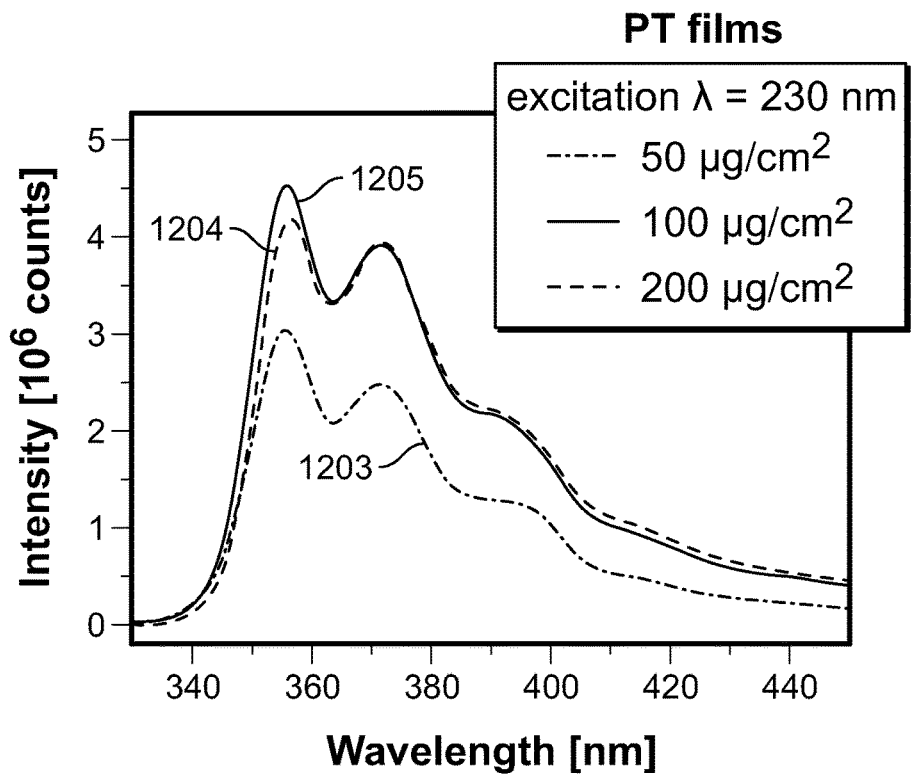
FIG. 12B illustrates a photoluminescence spectra for p-terphenyl films of different layer thickness at an excitation wavelength of 230 nm; and, FIG. 13 illustrates simulation results for detection of Cerenkov radiation with and without the application of wave length shifter film, in accordance with an embodiment of the present specification.

FIG. 12B illustrates a photoluminescence spectra of PT films of different layer thickness at an excitation wavelength of 230 nm. In FIG. 12B, 1203 represents the photoluminescence spectra for a PT film of 50 µg/cm$^2$ thickness, 1204 represents the photoluminescence spectra for a PT film of 100 µg/cm$^2$ thickness and 1205 represents the photoluminescence spectra for a PT film of 200 µg/cm$^2$ thickness. One can appreciate from the graph shown in FIG. 12B that as the thickness of film increases from 50 µg/cm$^2$ to 100 µg/cm$^2$, there is a marked increase in the intensity level. However, the intensity level for 200 µg/cm$^2$ film is similar to the intensity level observed for 100 µg/cm$^2$. Therefore, a PT film with a thickness of approximately 100 µg/cm$^2$ absorbs almost all of the incoming photons and it represents an optimum thickness for the PT film based wave length shifter.

Figure 13:
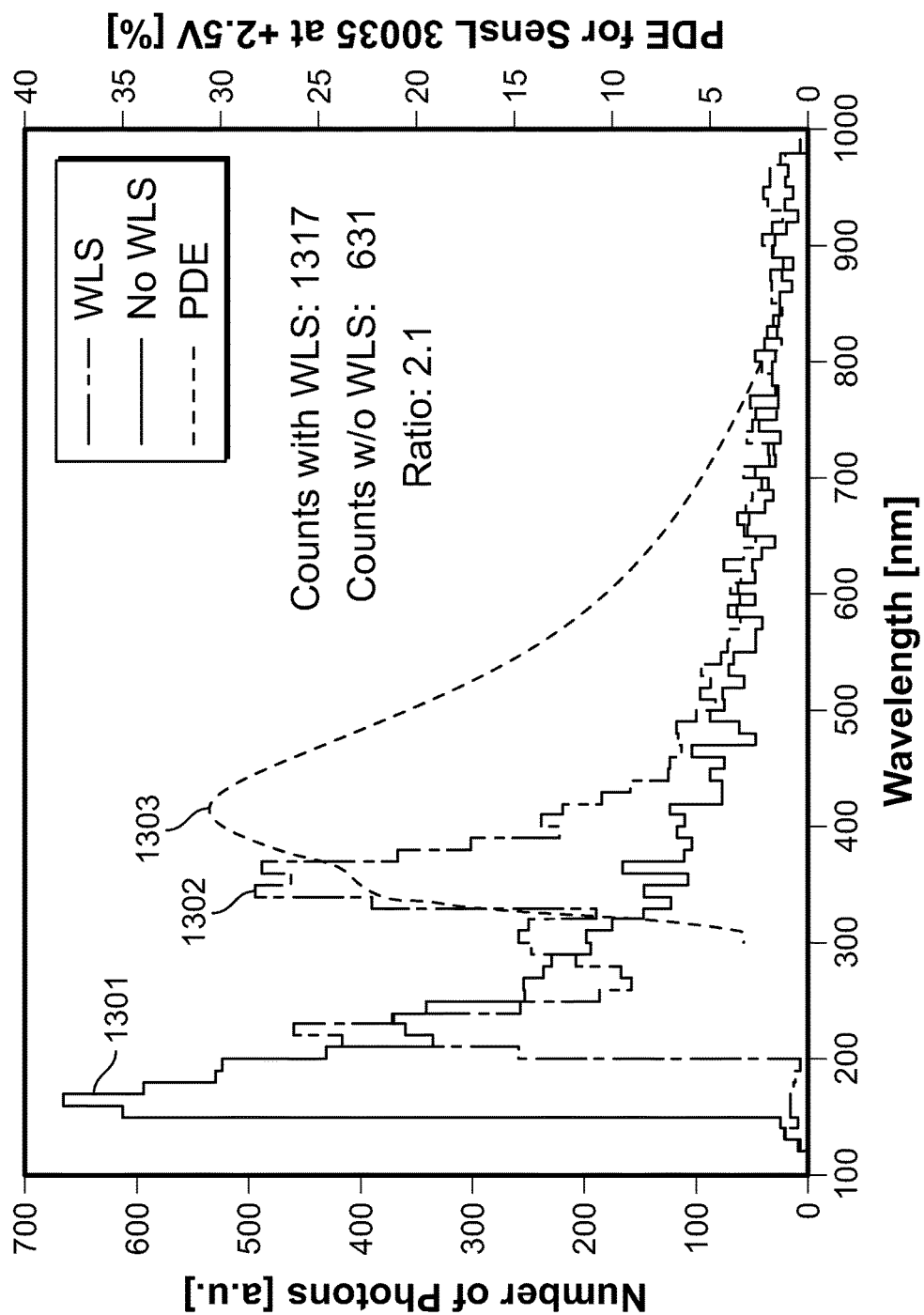

FIG. 13 illustrates the simulation results for detection of Cerenkov radiation with and without the application of a wave length shifter, in accordance with an embodiment of the present specification. In FIG. 13, a histogram is shown which depicts the number of photons detected by a photon multiplier such as a solid state photon multiplier (SSPM) at various wavelengths of incident radiation. In the above embodiment of the present specification, the UV Cerenkov radiation is shifted to higher wavelengths with the application of a WLS film. In FIG. 13, curve 1301 represents a photon histogram without any WLS film and 1302 represents the photon histogram with a WLS film. For radiation having a wavelength greater than 300 nm, the detection efficiency is higher when a WLS film is used. Graph 1303 represents a photo detection efficiency of the photon multiplier (SSPM) at various radiation wavelengths. In a specific simulation process, photon counts with WLS film were 1317 as compared to a photon count of 631 without the WLS film, implying that the application of WLS enhances the signal from Cerenkov radiation approximately by a factor of 2.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. An X-ray inspection system comprising an X-ray source and a detector for detecting transmitted X rays having a range of intensities, wherein the detector comprises:
   at least one crystal adapted to produce a light signal upon interacting with said X rays, said at least one crystal being coupled with at least one photodiode and at least one photomultiplier;
   a processing unit coupled with the at least one crystal, wherein said processing unit is adapted to reject all detected radiation having energy levels below a predefined threshold value; and
   wherein the at least one crystal comprises at least one face, wherein the at least one face of said at least one crystal is coated with a wavelength shifter material for shifting Cerenkov radiation to frequencies to improve detection efficiency.

2. The X-ray inspection system of claim 1 further comprising a current integrator coupled with the photodiode.

3. The X-ray inspection system of claim 1 further comprising a single photon detector coupled with the photomultiplier adapted to enable energy sensitive single photon counting of the transmitted X-rays.

4. The X-ray inspection system of claim 1, wherein the X-ray source is at least one of a pulsed source and a continuous wave source.

5. The X-ray inspection system of claim 1, wherein the photomultiplier is a solid-state photomultiplier.

6. The X-ray inspection system of claim 1, wherein the at least one crystal comprises at least one of a Cerium-doped Lutetium Yttrium Orthosilicate (LYSO) scintillating crystal and a lead tungstate based scintillating crystal.

7. The X-ray inspection system of claim 1, wherein the at least one crystal comprises a non-scintillating material and wherein the at least one crystal is adapted to produce light signals by Cerenkov radiation.

8. The X-ray inspection system of claim 1, wherein said wavelength shifter material comprises p-terphenyl and teraphenylbutadiene.

9. The X-ray inspection system of claim 3, wherein the single photon detector is configured to operate across multiple energy thresholds.

10. The X-ray inspection system of claim 1 wherein the processing unit comprises at least one analog to digital converter (ADC).

11. An X-ray inspection system comprising an X-ray source and a detector adapted to detect transmitted X rays having a range of intensities, wherein the detector comprises:
- at least one crystal adapted to produce light signal upon interaction with said X-rays, wherein the at least one crystal is coupled with a first photodiode having a first area and a second photodiode having a second area and wherein the first area is different that the second area, wherein the second area is equal to 1/n of the first area and wherein the detector further comprises a third photodiode having a third area equal to 1/m of the first area, wherein n is a number equal to or greater than 2 and less than 50, and wherein m is a number equal to or greater than 4, less than 500, and greater than n;
- a first ADC coupled with said first photodiode and a second ADC coupled with the second photodiode; and
- a processing unit coupled with the first ADC and second ADC, wherein the processing unit is adapted to determine a final digital signal by using digital signals output by the first ADC, digital signals output by the second ADC, and a predefined formula.

12. The X-ray inspection system of claim 11 wherein the processing unit selects a final digital signal corresponding to a highest unsaturated signal from among the digital signals output by the first photodiode and the second photodiode.

13. The X-ray inspection system of claim 11 wherein the processing unit comprises at least one FPGA and at least one counting register.

14. The X-ray inspection system of claim 11, wherein the X-ray source is a high intensity source having an energy of 9 MV and power of 10 KW.

15. The X-ray inspection system of claim 11, wherein the X-ray source is one of a pulsed source and a continuous wave source.

16. The X-ray inspection system of claim 11, wherein the second area is equal to one sixteenth of the first area and wherein the third area is equal to $1/256$ of the first area.

17. An X-ray inspection system comprising an X-ray source and a detector for detecting transmitted X rays having a range of intensities, wherein the detector comprises:
- at least one crystal for producing a light signal upon interacting with the X rays, wherein the at least one crystal is coupled with a plurality of photodiodes of varying areas and a solid state photomultiplier, and wherein the at least one crystal comprises at least one face, wherein the at least one face of said at least one crystal is coated with a wavelength shifter material for shifting Cerenkov radiation to frequencies to improve detection efficiency;
- at least one current integrator coupled with the plurality of photodiodes;
- at least one single photon detector coupled with the solid state photomultiplier and adapted to enable energy sensitive single photon counting of the transmitted X rays; and
- a processing unit coupled with the photomultiplier for determining a signal indicative of the transmitted X-rays based on an intensity of signals output by said plurality of photodiodes.

18. The X-ray inspection system of claim 17 further comprising one or more ADCs coupled with said plurality of photodiodes, wherein each of said plurality of photodiodes is coupled with a distinct one of said one or more ADCs.

19. The X-ray inspection system of claim 17 wherein the processing unit is adapted to determine a final digital signal by using digital signals output by the one or more ADCs and a predefined formula.

* * * * *